Nov. 17, 1942.  V. C. PATTERSON  2,302,469

CONTINUOUS PASTEURIZATION

Filed Oct. 9, 1940  3 Sheets-Sheet 1

Fig. 1

Inventor
Velt C. Patterson
Dodge and Orr
Attorneys

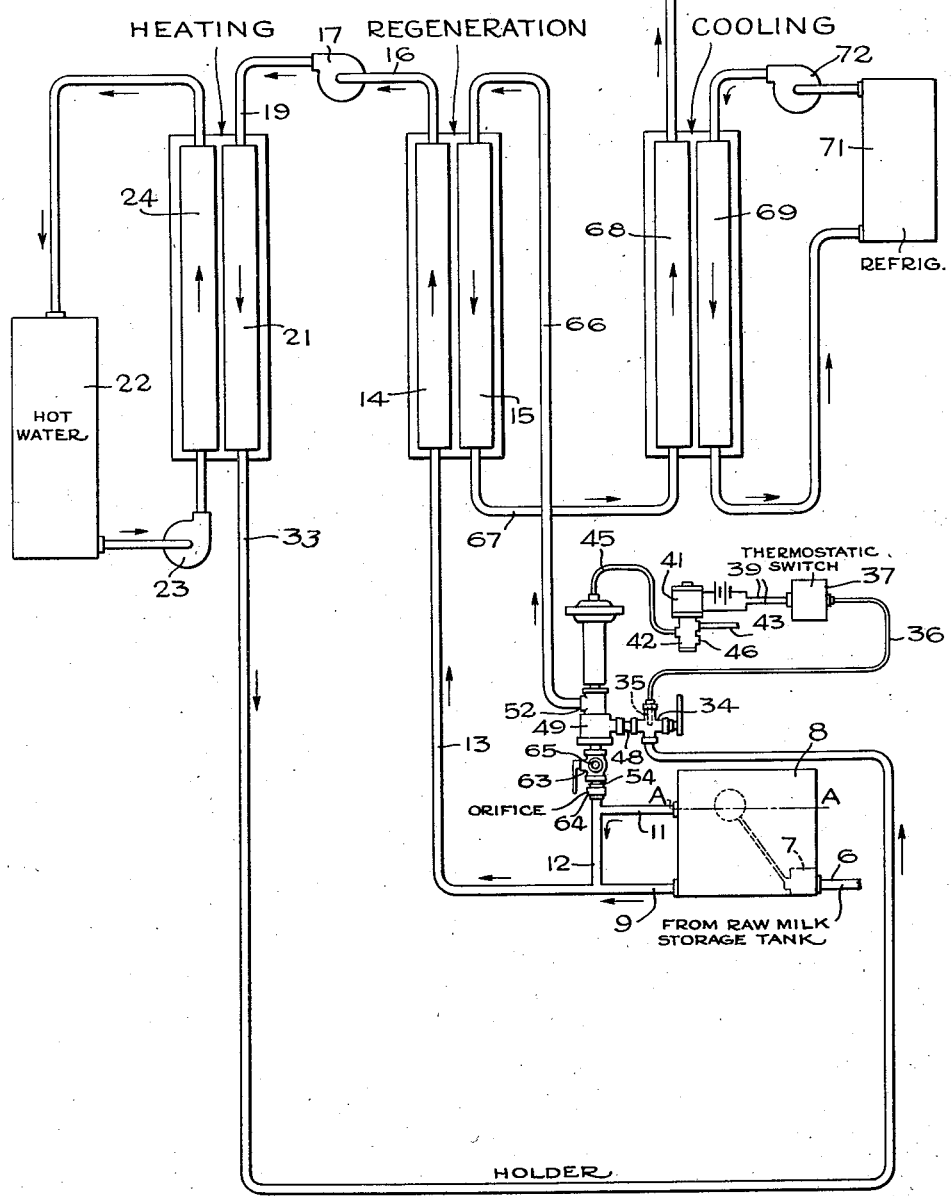

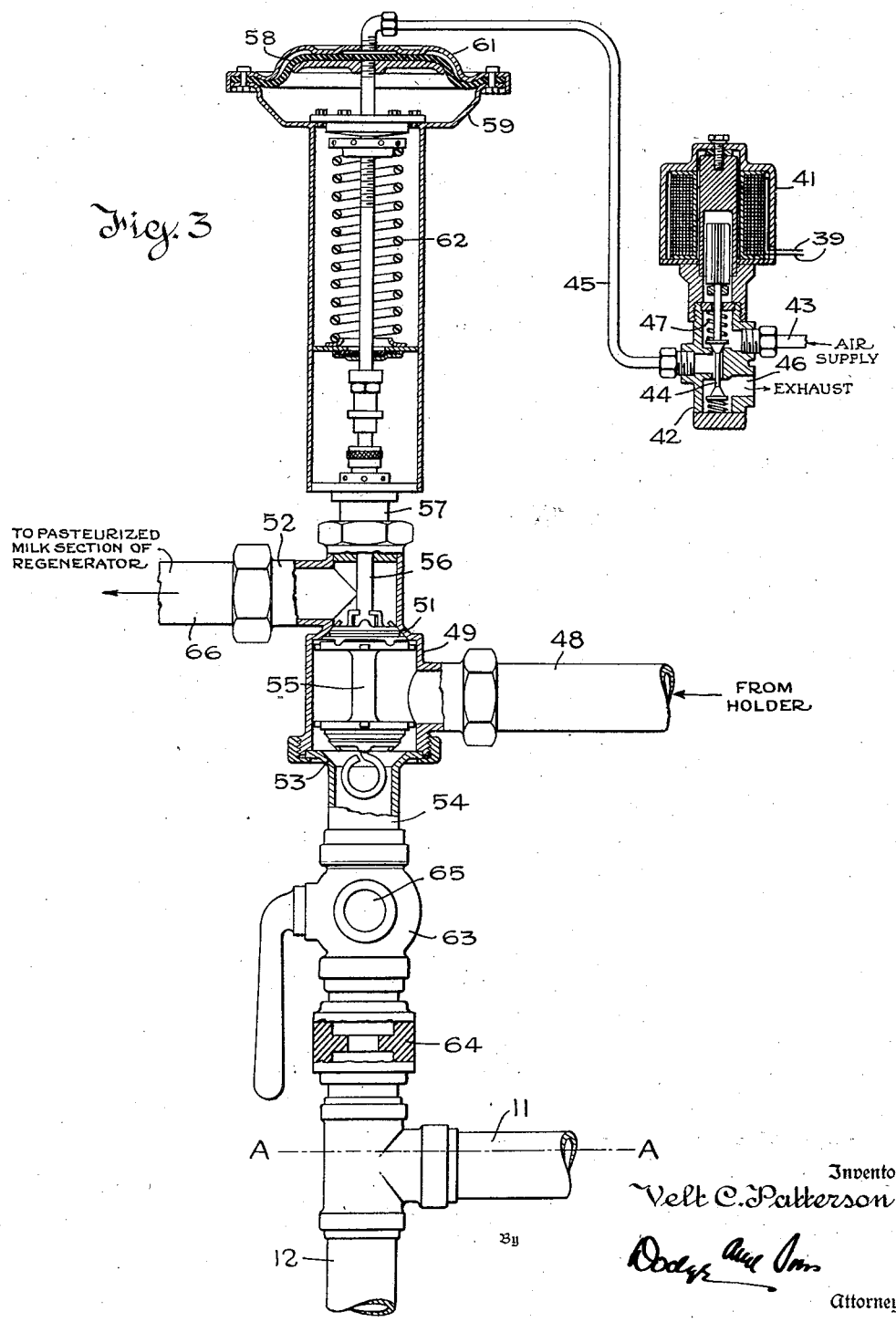

Patented Nov. 17, 1942

2,302,469

UNITED STATES PATENT OFFICE 2,302,469

CONTINUOUS PASTEURIZATION

Velt C. Patterson, York, Pa., assignor to York Ice Machinery Corporation, York, Pa., a corporation of Delaware Application October 9, 1940, Serial No. 360,517

9 Claims. (Cl. 257—2)

This invention relates to pasteurization, particularly pasteurization of milk, and has to do with a continuous process.

Because batch processes of pasteurization require considerable preiods of time and because the large holding tanks used in such systems occupy considerable space and do not add to the storage capacity of the plant, efforts have been made to develop time and space saving continuous pasteurization processes. The health authorities have been slow to approve continuous pasteurization processes because of uncertainty of control and because successful operation depends on a relatively short holding period which increases the risk in the event that any critical factor should escape proper control.

One of the continuous processes to receive the sanction of the health authorities involves the use of a plate type heat exchanger including distinct heating, cooling and regenerative sections and a so-called holder pipe through which milk heated to a pasteurizing temperature is passed at, or slightly below, a definite maximum flow rate, so that the pasteurizing temperature must be maintained for the required minimum period. In such a system a motor driven pump, driven at a definite volumetric rate which could not be exceeded, draws raw milk from a supply tank in which the level is maintained practically constant by a float valve controlling the supply of milk to the tank.

The path of the milk leaving the float tank is through the raw milk path of the regenerative section of the plate type heat exchanger. From this it passes to and through the heating section of the plate type heat exchanger in which it is heated to a pasteurizing temperature. The heating section is heated by hot water of accurately controlled temperature. This water is circulated by a pump through the plate type heat exchanger and through a heater in a closed circuit. The heater may be heated in any suitable manner but the temperature of the water leaving the heater must be closely controlled. A convenient way of heating the water is by a steam injector under automatic thermostatic control.

From the heater section the milk passes through a holder pipe or duct of such length and diameter that the passage of the milk from end to end will require a definite time sufficient to assure pasteurization. At the end of the holder pipe pasteurization will be complete provided the milk is then at a sufficiently high temperature hereinafter called the "legal temperature."

Assuming that this is the case, the milk then passes through the pasteurized milk path of the regenerative section of the plate type heat exchanger in which it exchanges heat with the raw milk approaching the heater section from the exchanger. The milk thus partially cooled then passes through the cooler section in which it exchanges heat with refrigerated brine. The brine is circulated and initially is at such temperature that the milk leaves the cooling section at a proper temperature for bottling and may be supplied directly to the bottling machine.

Such a circuit, once operating smoothly, is quite stable, but the critical factor is the temperature of the milk at the end of the holder pipe, that is, the milk discharging from the holder pipe normally to the regenerative section. At this point the flow of the milk is controlled by a diverting valve which is responsive to the thermostat subject to the temperature of the milk at the end of the holding pipe. If this temperature is at or slightly above the legal temperature, the milk passes to the regenerative section. If not, it is diverted so that it is recirculated and retraces the path which it previously followed from the float tank through the regenerative section, heating section and holder pipe. According to the prior art the practice was to divert the milk into the float tank. This has been discovered to be a harmful practice because of adverse effects on the cream line, and the like.

A favorable location for the pump that circulates the milk is between the regenerative section and the heating section. Thus the regenerative section is at subatmospheric pressure and the heating section is at a pressure higher than atmospheric. One effect of this is to cause in-leakage of air through any faulty joints which may exist between the float tank and the milk pump. This has caused considerable trouble in prior art installations because the effect was cumulative during diversion and recirculation and ultimately resulted in serious shock and vibration at the pump, sufficient even to rupture some of the pipes.

One feature of the present invention is the arrangement of the diverting connection in such a way that provision is made for gravity separation of air so that there is no cumulative tendency for air to be entrained with the milk during diversion and recirculation.

Another feature is the arrangement of the diverting connection in such a way that the diverted milk does not re-enter the float tank.

Another feature of the invention is an arrangement whereby diverted milk, which might otherwise remain inert in parts of the piping after the termination of the diversion function, is caused to circulate slowly in conjunction with milk drawn from the float tank. Consequently warm milk is not allowed to remain at rest in any part of the system.

In the prior art devices considerable difficulty was encountered in starting up the system, and particularly in establishing stable operating conditions. Thus if the diverting valve was in diverting position and, upon attainment of legal temperature at the end of holding pipe, shifted to the normal position, the action in the controls was apt to prove erratic. One feature of the invention is based on the discovery that erratic action is caused by changes of back pressure. In prior art installations the back pressure through the diverting valve is materially less than the back pressure through the pasteurizing milk side of the regenerative section and through the cooling system. Thus when the diverting valve shifts from either position to the other, the pressure conditions in the circuit are disturbed and flow rates change in consequence.

This difficulty has been overcome by the interposition in the path of diverted flow of a fixed orifice or other throttling means which will exert a back pressure substantially equal to that which is imposed by the flow through the regenerative and cooling units. As a consequence, operating conditions in the system are stabilized.

The usual practice in starting up a continuous pasteurizing system is first to circulate hot water through the path of the milk, the water being at a sterilizing temperature and additionally performing the useful function of starting the regenerative effects and conditioning the entire system thermally for operation on milk. When sterilization is complete and the temperature conditions have approached stability, the supply of water is cut off and the supply of milk is connected, the milk pushing the water ahead of it out of the system.

The difficulty encountered with arrangements heretofore used is that if the diverting valve should move to diverting position at the time that the milk is displacing the water, some of the water would be diverted into the entrance side of the milk circuit.

A feature of the present invention is the provision of a three-way valve in the path of the diverted milk and having a setting in which it disconnects the diverting pipe from the raw milk line and opens the discharge from the diversion pipe to waste, so that if during the displacing process the diversion valve functions, the diverted water will merely flow to waste.

In short, the invention shortens and stabilizes the starting period in continuous type pasteurizers without changing the basic principle underlying this type of pasteurizer. Furthermore, it stabilizes pressure conditions against disturbance by the operation of the diverting valve. It provides means for discharging water from the system without admixture with the milk during the water displacing period following sterilization, even if the diverting valve should then shift.

The preferred embodiment of the invention will now be described by reference to the accompanying drawings, in which:

Figure 1 is a perspective view of a continuous pasteurizing plant embodying the invention.

Fig. 2 is a flow path diagram of the same and of the control for the diverting valve.

Fig. 3 is an enlarged sectional view of the diverting valve and its connection.

In the following description reference will be made to milk as the liquid being treated simply for convenience and without implying any necessary limitation to milk. The apparatus is designed primarily for milk pasteurization and in the interests of a simple discussion we shall refer to milk as the treated fluid, hot water as the heating fluid and brine as the refrigerating fluid, because that accords with common practice. This does not imply an intention to introduce limitations in these respects, for any liquid which might be pasteurized could be treated in the circuit and any desired heating and cooling fluids might be used in the interchanger.

Referring first to Figs. 1 and 2, the raw milk from the storage tank (not shown) is led through a pipe 6 and float valve 7 to a container 8, in which the float valve functions to maintain the milk level A—A. From the container 8 a main offtake 9 leads. There is also an auxiliary offtake 11 which leads from the container and is in communication with the main offtake 9 by way of the bypass 12, hereinafter discussed in greater detail. The offtake 11 is at such height that it is not completely submerged in liquid; i. e., line A—A is below the top and above the bottom of the offtake.

From the junction of the bypass 12 in the main offtake 9 the raw milk line 13 leads to the raw milk path 14 of the regeneration section of the plate type heat exchanger. In the regeneration section the raw milk is heated by heat exchange with completely pasteurized milk passing through the pasteurized milk path 15 of the regeneration section.

In Fig. 2 this heat exchanger is indicated in simple diagram, and counter flow is indicated. In Fig. 2 and in Fig. 1 the regeneration section is indicated by the legend Regeneration. It should be understood that the heat exchanger may be of the plate type shown generally in the patent to Seligman 1,609,971, Dec. 7, 1926. A refined embodiment of the plate type heat exchanger using thin stainless steel plates is illustrated in the patent to Groat 2,181,230, Nov. 28, 1939. These plate type heat exhangers are made up of separate plates ported to produce the desired characters of flow and generally so arranged that in each section (composed of a plurality of plates) there are a plurality of passes of the two liquids which exchange heat. The flow from plate to plate may be in series or may be in parallel, but the present invention is not concerned with the characteristics of flow.

As the construction of these heat exchangers is complicated and as the flow paths are even more complicated, it seems inexpedient to attempt discussion beyond pointing out that known apparatus can be used to produce heat exchange of the various types required. It may be helpful, however, to explain at this point that such exchangers generally include three distinct sections, a regeneration section for economizing heat, a heating section in which the milk is heated to a pasteurizing temperature by the use of a heating medium, usually hot water, and a cooling section in which the pasteurized milk leaving the exchanger is cooled to final or bottling temperature.

From the raw milk path of the regeneration section the milk flows by pipe 16 through a pump 17 which is driven by an electric motor at a definite volumetric rate. Thus control is imposed by limiting the capacity of the pump and the rate at which it may be driven by the motor 18. Such controls are known and consequently are not here illustrated.

From the pump 17 the milk flows through a pipe 19 to and through the milk heating path 21 of the heating section of the heat exchanger. This section is indicated by the legend Heating in Figs. 1 and 2. Water heated in the heater 22 is circulated by a water pump 23 through the heating water path 24 of the heating section of the heat exchanger. The temperature of the water circulated through the heating section 24 is automatically controlled. In Fig. 1 a thermostatic bulb 25 is indicated. This is connected by the tube 26 with a controller 27 mounted on the control board 28. Controller 27 is connected by tube 29 with the controlling motor 31 of steam valve 32. The controller 27 thus regulates the supply of heating steam to the heater 22, and since the supply is controlled in response to the temperature of hot water leaving the pump 23, the effect is to maintain constant the temperature of water supplied to the section 22 of the heat exchanger.

Since the milk is circulated at a constant rate, it should leave the section 21 at a uniform standard temperature. The discharging milk so heated to standard temperature flows through the holder pipe 33, which is of a length and diameter so coordinated with the flow rate of milk that a definite time will elapse between discharge from the heater section 21 and arrival at the fitting 34.

In the fitting 34 is a thermostatic bulb 35 which is connected by tube 36 with a thermostatic switch 37. This switch, through the conductors 39, controls an electric circuit through winding 41 of the combined admission and exhaust air valve whose body appears at 42. This valve is shown in section in Fig. 3. Tube 43 supplies air under pressure and a double-beat poppet valve 44 operates to connect the branch line 45 selectively with the compressed air supply 43 or with an exhaust port 46. When the winding 41 is deenergized, a spring 47 closes the inlet valve and opens the exhaust valve. This is the condition which exists when temperature at the bulb 35 is below the legal temperature. Under such conditions the milk is sent from the holder back through the path which it had previously traced.

The path is from the fitting 34 through branch pipe 48 to the side port of the diverting valve whose body appears at 49. The body 49 has an upper seat 51 which controls flow to the normal flow connection 52. There is a lower seat 53 which controls flow to the recirculation or bypass connection 54. A double-beat poppet valve, generally indicated by the numeral 55, closes against one of these seats and opens the other.

Valve 55 is mounted on a stem 56 which extends through the packing gland 57 and is connected at its upper end to the center of the diaphragm 58. This diaphragm is clamped at its periphery between the housings 59 and 61, and the connection 45 previously described leads to the space above the diaphragm 58. A spring 62 biases the diaphragm 58 in an upward direction.

Hence, when the milk reaches fitting 34 at lower than legal temperature the thermostatic bulb 35 causes the thermostatic switch 37 to deenergize winding 41. The double-beat valve 44 moves to its lowermost position, venting the space above diaphragm 58 with the result that the diaphragm moves upward, closes the normal discharge connection 52, and connects the bypass or recirculation connection 54 with the discharge end of the holding pipe.

Connection 54 leads through the three-way or stop-and-waste valve 63 and a restricted orifice 64 to the upper end of the bypass 12 previously described. In the normal position of the valve 63 it establishes direct communication from the connection 54 through the restriction 64 to the bypass. When the valve is set at 90° from the position shown, communication from connection 54 to restriction 64 is cut off and the connection 54 is connected to a side vent 65. This last position is the one used while water is being displaced from the system, as will later be described.

From the connection 52 the pipe 66 leads to the pasteurizing milk path 15 of the regeneration section. From the pasteurized milk path 15 the milk is conducted through the pipe 67 to the milk path 68 of the cooling section of the heat exchanger. As it flows through this cooling section it is cooled by heat exchange with refrigerated brine passing through the brine path 69 of the cooling section. The brine is chilled in the refrigerative cooler 71 and circulated by a motor driven pump 72. The milk leaving the milk path of the cooler flows by way of pipe 73 to a bottler or the like, not shown.

Under normal conditions the path of the milk is through the pipe 13 through the raw milk path of the regenerator, through the heater to the holder and then through the pasteurized milk path of the regenerator. Here the pasteurized milk gives up heat to the raw milk approaching the heater. The pasteurized milk thus partially cooled passes through the cooling section of the heat exchanger to the bottler.

However, if the milk leaving the holder 33 is at sublegal temperature, that fact will be sensed by the bulb 35, with the result that the valve 55 will shift to its uppermost position, interrupting flow to the discharge pipe 66 and diverting the milk through the valve 63 and restricting orifice 64 to the bypass 12 and thence again through the first part of the circuit.

The function of the orifice 64 is to exert upon the flowing milk the same back pressure that would be exerted upon flow through the pipe 66, pasteurized milk path 15, pipe 67, cooler path 68 and pipe 73 to the bottler. The use of the flow restricting orifice is important because it maintains a definite back pressure on the pump 17 irrespective of the shift of the valve 55, and hence stabilizes the milk flow rate.

The arrangement of the bypass 12 with the top connection 11 so located that it is partly milk filled, but not completely submerged, is important. When the valve 55 shifts from its lower to its upper position, that is to the position shown in Fig. 3, milk is delivered to the bypass 12, and is in heated condition. If this milk were allowed to stand in the bypass, bacterial action would commence. However, stagnation in the bypass is prevented. When the valve 55 is in its uppermost position there is active circulation through the bypass. If any air be then entrained in the milk, gravity separation of such air occurs. The air escapes through the upper portion of pipe 11. When the valve 55 shifts to its lowermost position, since the upper portion of the connection 11 is open to atmosphere, drainage of that part of the milk path from valve seat 53 down to the level A—A occurs. A portion of the milk drawn into the pipe 13 by operation of the pump 17 flows through the connection 11 and bypass 12. In this way effective circulation is maintained at all times and stagnation of warm milk is prevented.

Bypass 12 is wholly external to the container 8 and the arrangement described has a definite advantage over prior art arrangements in which the circulated milk was delivered to the container 8 or its analogue.

The stop-and-waste valve 63 is used only when the machine is being started up. The usual practice is to commence circulating hot water through the circuit already described. This water is hot enough to sterilize the entire pasteurizing plant. When the water has been circulated long enough to effect sterilization, the practice is to substitute milk for water at the connection 6, the milk serving to force water ahead of it out of the circuit. Under these conditions the diverting valve 55 will normally remain in its lowermost position and, if it does, the intended displacement of the water occurs. However, it occasionally happens that the diverting valve 55 will shift to its uppermost position before all the water has been displaced beyond the connection 34. The effect of such shift, if it occurred at such a time, would be to deliver water into the milk stream flowing through the pipe 13. To prevent this the stop-and-waste valve 63 is closed during starting. It disconnects the diverting valve from the bypass 12 and connects it to waste. Hence, if the diverting valve functions while water is flowing or is being displaced, the water so diverted will merely discharge at the port 65, doing no harm and indicating the operation of the diverting valve.

While one embodiment of the invention has been described in detail, this is intended to be illustrative. The invention is not limited strictly to the use of a plate type heat exchanger or to any particular plate type heat exchanger. The invention does not change the basic pasteurizing circuit but does stabilize the action of the circuit and effects this particularly during the starting period. Obviously, since the milk derives part of its heat from the regeneration section and part from the heating section, and since the amount of heat delivered by the regeneration section is dependent on the arrival of warm liquid in the pasteurized milk path of the regeneration section, the development of stable conditions at the start of operations is difficult. By accelerating the development of stable conditions, the invention not only saves time but also saves milk which would be lost by protracted unstable operation.

I claim:

1. A continuous pasteurizer comprising a container for fluid to be pasteurized; means for supplying fluid thereto; means forming a flow path through which fluid may be continuously passed from said container, said flow path containing, in the order stated, means for heating the flowing fluid to a pasteurizing temperature and a holder duct in which said fluid flows at such pasteurizing temperature; impelling means for causing fluid to flow in said path; a bypass from the discharge end of said holder duct to the entrance of said flow path; control means responsive to the temperature of the fluid at the discharge end of the holder duct; and a valve controlled by said control means and serving to connect the discharge end of the holder duct selectively to discharge or to said bypass, the bypass being so arranged that when said valve connects the holder duct to discharge, at least a portion of the fluid flowing from said container to said circuit passes through the major portion of said bypass.

2. A continuous pasteurizer comprising a container for fluid to be pasteurized; means for supplying fluid thereto; a heat exchange device comprising a heating section, a cooling section and a regenerative section; a holder duct; connections for leading fluid from said container to the heating path in said regenerative section, then through the heating section, then through the holder duct, then through the cooling path in the regenerative section, and then through the cooling section to a point of discharge; a pump for circulating fluid through the above defined course, said pump being in advance of the holder duct; a bypass leading from the end of the holder duct to the inlet of the heating path of the regenerative section; a switch valve serving selectively to connect the end of the holding section with said bypass or with the inlet to the cooling path of the regenerative section; means responsive to the temperature of the fluid at the end of said holder duct for controlling said valve; and means associated with said bypass and resisting flow therethrough, the degree of resistance offered by said means approximating the resistance to flow offered by the cooling path of said regenerative section and by said cooler, whereby the rate of flow through the holder duct is not affected by the position of said valve.

3. A continuous pasteurizer comprising a container for fluid to be pasteurized; means for supplying fluid thereto; a heat exchange device comprising a heating section, a cooling section and a regenerative section; a holder duct; connections for leading fluid from said container to the heating path in said regenerative section, then through the heating section, then through the holder duct, then through the cooling path in the regenerative section, and then through the cooling section to a point of discharge; a pump for circulating fluid through the above defined course, said pump being in advance of the holder duct; a bypass leading from the end of the holder duct to the inlet of the heating path of the regenerative section; a switch valve serving selectively to connect the end of the holding section with said bypass or with the inlet to the cooling path of the regenerative section; means responsive to the temperature of the fluid at the end of said holder duct for controlling said valve; means associated with said bypass and resisting flow therethrough, the degree of resistance offered by said means approximating the resistance to flow offered by the cooling path of said regenerative section and by said cooler, whereby the rate of flow through the holder duct is not affected by the position of said valve; and a manually operable multi-way valve operable to close said bypass and open a discharge from said bypass in advance of said closure.

4. A continuous pasteurizer comprising a container for fluid to be pasteurized; means for supplying fluid thereto; a heat exchange device comprising a heating section, a cooling section and a regenerative section; a holder duct; connections for leading fluid from said container to the heating path in said regenerative section, then through the heating section, then through the holder duct, then through the cooling path in the regenerative section, and then through the cooling section to a point of discharge; a pump for circulating fluid through the above defined course, said pump being in advance of the holder duct; a bypass leading from the end of the holder duct to the inlet of the heating path of the regenerative section; a switch valve serving selectively to connect the end of the holding section with said bypass or with the inlet to the cooling path of the regenerative section; means responsive to the temperature of the fluid at the end of said holder duct for controlling said valve; means associated with said bypass and resisting flow therethrough, the degree of resistance offered by said means approximating the resistance to flow offered by the cooling path of said regenerative section and by said cooler, whereby the rate of flow through the holder duct is not affected by the position of said valve; and an auxiliary connection from said container to said bypass so arranged that when said valve is positioned to direct fluid to the cooling path of said regenerative section a portion of the fluid passing from said container flows through said bypass.

5. A continuous pasteurizer comprising a container for fluid to be pasteurized; means for supplying fluid thereto; means forming a flow path through which fluid may be continuously passed from said container, said flow path containing in the order stated, means for heating the flowing fluid to a pasteurizing temperature and a holder duct in which said fluid flows at such pasteurizing temperature; impelling means for causing fluid to flow in said path; a bypass from the discharge end of said holder duct to the entrance of said flow path; control means responsive to the temperature of the fluid at the discharge end of the holder duct; a valve controlled by said control means and serving to connect the discharge end of the holder duct selectively to discharge or to said bypass; an auxiliary connection between said container and said bypass so arranged that when the valve connects the holder duct to discharge at least a portion of the fluid flowing from said container to said circuit passes through the major portion of the bypass, and when said valve connects the holder duct to said bypass gravity separation of entrained air is afforded.

6. A continuous pasteurizer comprising a container for fluid to be pasteurized; liquid level controlled means for supplying fluid thereto and serving to maintain a definite liquid level therein; means forming a heating and holding flow path through which fluid may be passed from said container to effect pasteurization; means forming a cooling discharge flow path; impelling means for causing flow in the first named flow path; a bypass distinct from the container from the discharge end to the entrance end of said first named flow path; control means responsive to the temperature of fluid at the end of the first named flow path; valve means controlled by said control means and serving to connect the discharge end of the first named path selectively with said bypass and with said cooling and discharge path; and a multi-way valve operable to close the entrance to said bypass and open an auxiliary vent in advance of such closure.

7. A continuous pasteurizer comprising a container for fluid to be pasteurized; liquid level controlled means for supplying fluid thereto and serving to maintain a definite liquid level therein; means forming a heating and holding flow path though which fluid may be passed from said container to effect pasteurization; means forming a cooling discharge flow path; impelling means for causing flow in the first named flow path; a bypass distinct from the container from the discharge end to the entrance end of said first named flow path, said bypass having a communication with said container; control means responsive to the temperature of fluid at the end of the first named flow path; valve means controlled by said control means and serving to connect the discharge end of the first named path selectively with said bypass and with said cooling and discharge path; and flow restricting means interposed between said valve and the entrance to the bypass, the flow resisting effect and the location of said means being so chosen as approximately to equalize the flow rates in the two positions of said valve, while limiting the back pressure developed in the bypass.

8. A continuous pasteurizer comprising a container for fluid to be pasteurized; means for supplying fluid thereto; a heat exchange device comprising a heating section, a cooling section and a regenerative section; a holder duct; connections for leading fluid from said container to the heating path in said regenerative section, then through the heating section, then through the holder duct, then through the cooling path in the regenerative section, and then through the cooling section to a point of discharge; a pump for circulating fluid through the above defined course, said pump being in advance of the holder duct; a bypass leading from the end of the holder duct to the inlet of the heating path of the regenerative section; a switch valve serving selectively to connect the end of the holding section with said bypass or with the inlet to the cooling path of the regenerative section; means responsive to the temperature of the fluid at the end of said holder duct for controlling said valve; and a manually operable multi-way valve operable to close said bypass and open a discharge from said bypass in advance of said closure.

9. A continuous pasteurizer comprising a container for fluid to be pasteurized; means for supplying fluid thereto; a heat exchange device comprising a heating section, a cooling section and a regenerative section; a holder duct; connections for leading fluid from said container to the heating path in said regenerative section, then through the heating section, then through the holder duct, then through the cooling path in the regenerative section, and then through the cooling section to a point of discharge; a pump for circulating fluid through the above defined course, said pump being in advance of the holder duct; a bypass leading from the end of the holder duct to the inlet of the heating path of the regenerative section; a switch valve serving selectively to connect the end of the holding section with said bypass or with the inlet to the cooling path of the regenerative section; means responsive to the temperature of the fluid at the end of said holder duct for controlling said valve; and an auxiliary connection from said container to said bypass so arranged that when said valve is positioned to direct fluid to the cooling path of said regenerative section a portion of the fluid passing from said container flows through said bypass.

VELT C. PATTERSON.